US007444470B2

(12) United States Patent  (10) Patent No.: US 7,444,470 B2
Makita                    (45) Date of Patent:     Oct. 28, 2008

(54) STORAGE DEVICE, CONTROL METHOD OF STORAGE DEVICE, AND REMOVABLE STORAGE MEDIUM

(75) Inventor: Satoshi Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 10/457,633

(22) Filed: Jun. 9, 2003

(65) Prior Publication Data

US 2003/0217226 A1    Nov. 20, 2003

Related U.S. Application Data

(63) Continuation of application No. PCT/JP00/09168, filed on Dec. 22, 2000.

(51) Int. Cl.
G06F 12/00  (2006.01)
(52) U.S. Cl. ............... 711/115; 711/156; 711/170; 710/13
(58) Field of Classification Search ......... 711/115, 711/118, 170, 154, 156; 710/13
See application file for complete search history.

(56) References Cited

U.S. PATENT DOCUMENTS

| 4,506,346 A | * | 3/1985 | Bennett et al. ............... 711/115 |
| 4,562,535 A | * | 12/1985 | Vincent et al. ............... 710/104 |
| 4,703,416 A | * | 10/1987 | Crupi et al. ................. 711/115 |
| 5,418,918 A | * | 5/1995 | Vander Kamp et al. ......... 713/2 |
| 5,493,727 A | * | 2/1996 | Ohya ............................ 713/1 |
| 5,687,394 A | * | 11/1997 | Nakamura ..................... 710/33 |
| 5,778,431 A | * | 7/1998 | Rahman et al. ............... 711/135 |
| 5,781,921 A | * | 7/1998 | Nichols ........................ 711/115 |

(Continued)

FOREIGN PATENT DOCUMENTS

EP    1 059 769    12/2000

(Continued)

OTHER PUBLICATIONS

Kubota, Kenichi, "Address Allocation System for Program Module", May 1989, English Translation of JP 01120624 A.*

*Primary Examiner*—Matt Kim
*Assistant Examiner*—Michael C Krofcheck
(74) *Attorney, Agent, or Firm*—Greer, Burns & Crain, Ltd.

(57) ABSTRACT

A storage device executes a program matching a removable storage medium. The device has a drive unit for reading the storage medium, a program memory for storing a program module required for processing of a storage device and a module list, a random access memory, and a processor for performing access processing of the data of the storage medium by referring to the module list and executing the program module. The processor reads the program module stored in the storage medium, develops the program module in the random access memory, and registers the read module in the module list. The programs which run on an external storage device are distributed and recorded on the ROM of the external storage device and on the removable medium which is inserted into the external storage device, and are read and executed whenever necessary, so the ROM capacity required by the external storage device can be decreased, and the programs which run on the replaceable external storage device are recorded on the replaceable storage medium and are read and executed whenever necessary, so the programs matching with (optimized for) the features of the respective replaceable medium can be executed.

17 Claims, 12 Drawing Sheets

U.S. PATENT DOCUMENTS

| | | | |
|---|---|---|---|
| 6,088,765 A * | 7/2000 | Ohtsuka | 711/113 |
| 6,141,730 A * | 10/2000 | Nishiumi et al. | 711/115 |
| 6,480,905 B1 * | 11/2002 | Jesionowski et al. | 710/8 |
| 6,601,139 B1 * | 7/2003 | Suzuki | 711/115 |
| 2001/0049727 A1 * | 12/2001 | Mukherjee et al. | 709/219 |

FOREIGN PATENT DOCUMENTS

| | | | |
|---|---|---|---|
| JP | 01120624 A * | 5/1989 | |
| JP | 5-012026 | 1/1993 | |
| JP | 5-120024 | 5/1993 | |
| JP | 6-187141 | 7/1994 | |
| JP | 8-147113 | 6/1996 | |
| JP | 9-101887 | 4/1997 | |
| JP | 2000263897 A * | 9/2000 | |
| WO | WO 00/35148 | 6/2000 | |

* cited by examiner

FIG. 5

MODULE LIST ON DRIVE(0000 Hex ~ 00FF Hex) 30

| MODULE NUMBER | START ADDRESS IN MEMORY | MODULE LENGTH |
|---|---|---|
| 0 | 0100 Hex | 0300 Hex |
| 1 | 0400 Hex | 02A0 Hex |
| 2 | 06A0 Hex | 04FD Hex |
| ⋮ | ⋮ | ⋮ |
| 20 | 3500 Hex | 01DE Hex |

FIG. 6

MODULE LIST READ FROM MEDIUM 106

| MODULE NUMBER | START ADDRESS IN MEDIUM | MODULE LENGTH |
|---|---|---|
| 2 | 0000 Hex | 0450 Hex |
| 25 | 0450 Hex | 01A0 Hex |

LBA: Logical Block Address (SECTOR NUMBER)

STORAGE DEVICE, CONTROL METHOD OF STORAGE DEVICE, AND REMOVABLE STORAGE MEDIUM

This is a continuation of International PCT Application No. PCT/JP00/09168 filed Dec. 22, 2000.

TECHNICAL FIELD

The present invention relates to a storage device which allows replacing a storage medium, a control method thereof, and a removable storage medium thereof, and more particularly to the storage device utilizing a storage medium where a part of the software executed by the storage device is stored, a control method thereof, and a removable storage medium thereof.

BACKGROUND ART

As a storage device of a computer, an external storage device using a removable storage medium is widely used. For this storage medium, various types are used, including a magnetic disk, optical disk, magneto-optical disk and semiconductor memory. The storage capacity of such an external storage medium has been increasing each year, but it is desired that the price of the drive device for regenerating, recording or erasing information of these external storage medium will further decrease.

Generally speaking, a storage device (drive) is comprised of a drive unit for driving a storage medium, MPU, ROM, RAM and an interface with the host computer (e.g. PC). The removable storage medium is inserted into the drive unit and then can be used.

Conventionally, the control program of the drive is stored statically on ROM and the program stored on ROM is executed by the MPU. And to execute a program on ROM, the data area which the program requires is secured on RAM.

For example, in a disk drive, a READ instruction, which is sent from the host computer, is executed according to the following procedure.

(1) Since the instruction is sent from the host computer, the main program calls up the instruction interpreter program on ROM.

(2) The instruction interpreter program judges that the instruction sent is a READ instruction.

(3) Since the instruction is judged as a READ instruction, the main program calls up the READ program on ROM.

(4) The READ program judges the start sector and the number of sectors to be read from the start sector on the medium.

(5) The READ program calls up the cache program on ROM and queries whether data on the sectors to be read exists in the cache data.

(6) If applicable data exists, the cache program provides the data to the READ program. If applicable data does not exist, the cache program calls up the medium access program on ROM, reads applicable data on the medium, and provides the read data to the READ program.

(7) The program provides the read data to the host computer via the interface program.

In this way, a conventional drive device stores all the control programs of the drive on ROM in advance, so a ROM which has sufficient capacity to store all the programs is required. To decrease the ROM capacity of the drive device, a control program is stored in an area of the hard disk, in a hard disk drive where a disk is fixed in the device (e.g. Japanese Patent Laid-Open No. 5-12026).

This method, however, allows a fixed disk, fixed in the device (i.e. fixed within a non-removable storage device) to share a part of the control program of the drive device, and a capacity to store control programs is not changed in the entire storage area of the device. For this, it is necessary to store control programs which are not really needed when the user uses the drive device. For example, even when the user desires not to use the cache program, the program must be stored on ROM or the disk.

At the same time, a plurality of program which do not operate simultaneously are stored on ROM, so the capacity of a non-operating program must also be secured in a memory area totaling the ROM and RAM. For example, a disk program for a PC and a disk program for AV (Audio/Visual) have respective control programs, like a cache program, optimized for respective purposes, which operate but never operate simultaneously. Both of these control programs must be stored in the memory area, which makes decreasing cost difficult.

Another problem is that when a minimal control program is mounted, a cache program matching the characteristic of the removable storage medium cannot be used even if the capacity and logical format are different on a removable storage medium, such as an MO. Also adding a program is difficult, and increasing the functions of the drive is difficult as well.

On the other hand, a method for installing a program to be executed by a host, such as a personal computer, using a floppy disk (e.g. Japanese Patent Laid-Open No. 5-120024), or a method of adding a program to a host using a CD-ROM where a program (e.g. read software) and data to be executed by the host, are stored, and performing data processing. These methods, however, are for installing a program to be executed by a host and not for changing the functions of a drive device, so the functions of the drive device cannot be changed by these methods.

DISCLOSURE OF THE INVENTION

With the foregoing in view, it is an object of the present invention to provide a storage device for executing control programs matching with the features of the respective storage medium, and a control method and removable storage medium thereof.

It is another object of the present invention to provide a storage device for executing control programs matching with the features of the respective storage medium without increasing the internal memory of the storage device, and a control method and removable storage medium thereof.

It is still another object of the present invention to provide a storage device for executing control programs matching with the features of the respective storage medium by inserting the storage medium, and a control method and removable storage medium thereof.

To achieve these objects, the storage device of the present invention comprises a drive mechanism for at least reading data of a removable storage medium, a memory for access for storing a program module required for processing the storage device and a module list, and a processor for performing access processing of the data of the storage medium by referring to the module list and executing the program module. The processor reads the program module stored in the storage medium, develops the program module in the memory for access, and registers the read module to the module list.

According to the present invention, a program which operates on an external storage device is distributed and recorded on the ROM of the external storage device and the removable medium which is inserted into the external storage device, and is read and executed whenever necessary. Therefore the ROM capacity required by the external storage device can be decreased, and programs which are not simultaneously executed are recorded on the medium of the external storage device so as to be read and executed whenever necessary, so the capacity of the memory area totaling the ROM and RAM required by the external storage device can be decreased. Also the program which operates on the removable external storage device is recorded on the removable storage medium so as to be read and executed whenever necessary, so a program matching with (optimized for) the features of the respective replaceable medium can be executed.

In the storage device of the present invention, it is preferable that the processor reads the program module stored in the storage medium when the storage medium is inserted, develops the program module in the memory for access, and registers the read module in the module list. Therefore, a program module unique to the storage medium is read by inserting the storage medium, and can be executed in the storage device.

Also in the storage device of the present invention, it is preferable that the processor renders the registered program module invalid when the storage medium is ejected, so as to prevent a program module unique to the storage medium from being used by another storage medium.

Also in the storage device of the present invention, it is preferable that the processor detects the presence of the program module from the management information stored in the storage medium when the storage medium is inserted, reads the program module of the storage medium by the presence result, develops the program module in the memory for access, and registers the read module in the module list. Therefore the presence of the program module can be detected by reading the management information when the storage medium is inserted.

Also in the storage device of the present invention, it is preferable that the processor detects the presence of the program module by the module flag of the management information stored in the storage medium when the storage medium is inserted, so as to detect the presence of the program module simply, without decreasing the storage capacity.

Also in the storage device of the present invention, it is preferable that the processor reads the module list stored in the storage medium when the storage medium is inserted, reads the program module of the storage medium according to the module list, develops the program module in the memory for access, and registers the read module in the module list. Therefore the number of-program modules of the storage medium and storage position can be acquired, and programs can be loaded by installing the module list.

In the storage device of the present invention, it is preferable that the processor develops the module list of the memory for programs in the memory for access, refers to the module list where the read module is registered in the developed module list, and executes the program module. Therefore the module list can be read in advance and the program module can be loaded at a point when the program module of the storage medium is necessary.

BRIEF DESCRIPTION OF THE DRAWINGS

FIG. 5 is a diagram depicting the module list of the ROM (drive) in FIG. 1;

FIG. 6 is a diagram depicting the module list of the storage medium in FIG. 4;

BEST MODE FOR CARRYING OUT THE INVENTION

Embodiments of the present invention will now be described in the sequence of the external storage device, medium processing and other embodiments.

External Storage Device

Figure 1:
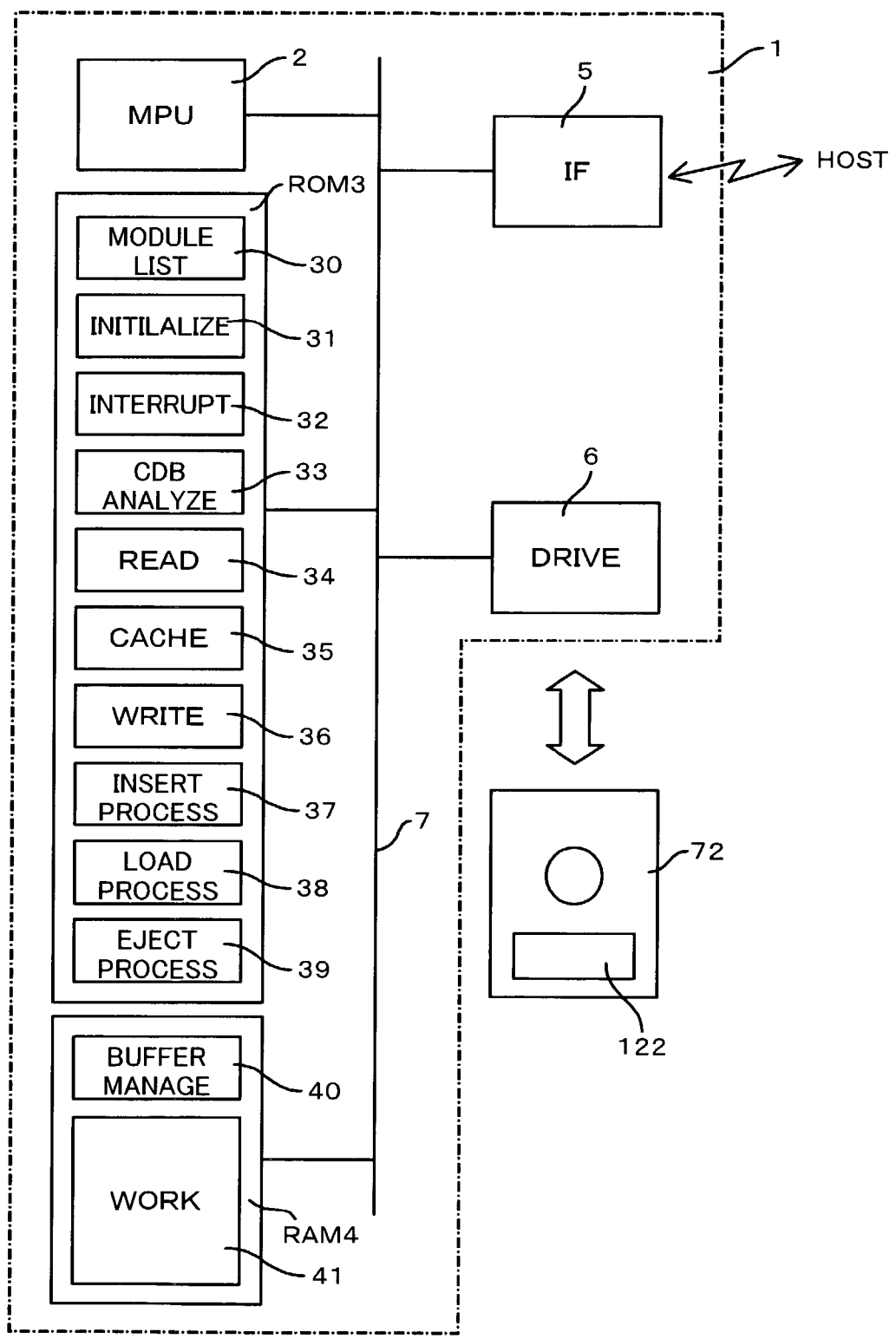
FIG. 1 is a block diagram depicting the external storage device of an embodiment of the present invention.
Figure 2:
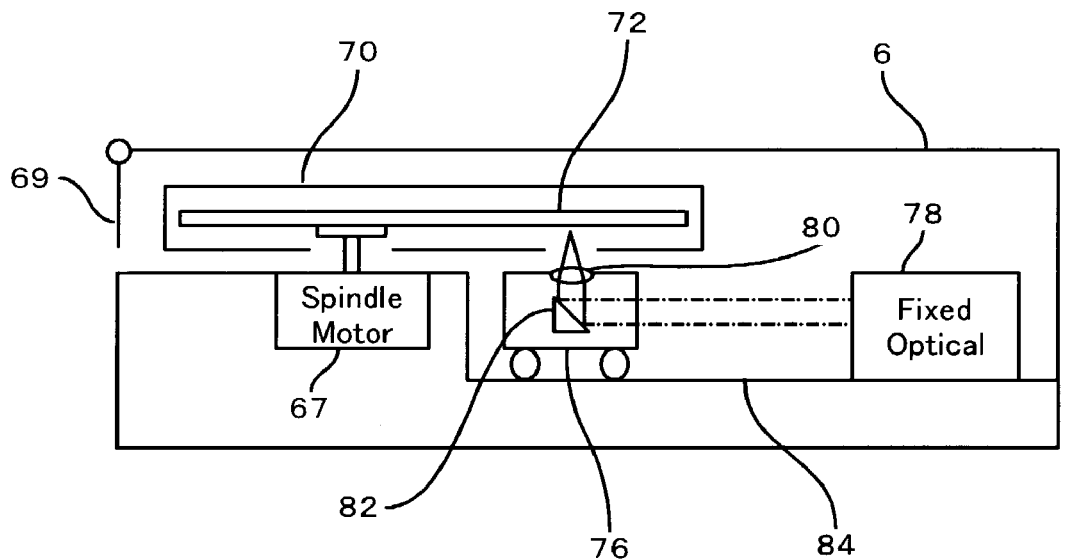
FIG. 2 is a block diagram depicting the drive mechanism in FIG. 1.
Figure 3:
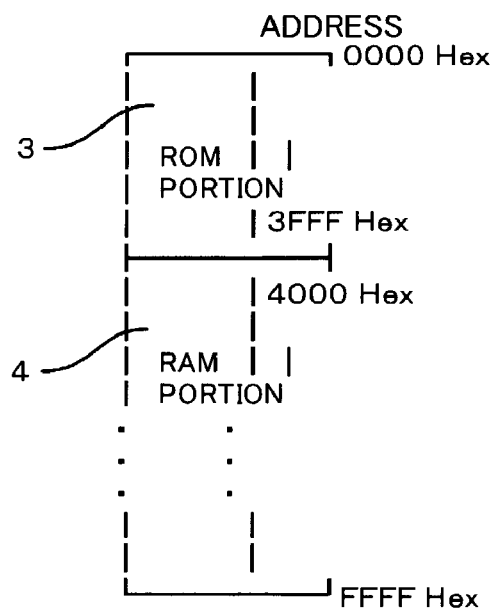
FIG. 3 is a diagram depicting the memory space in FIG. 1.
Figure 4:
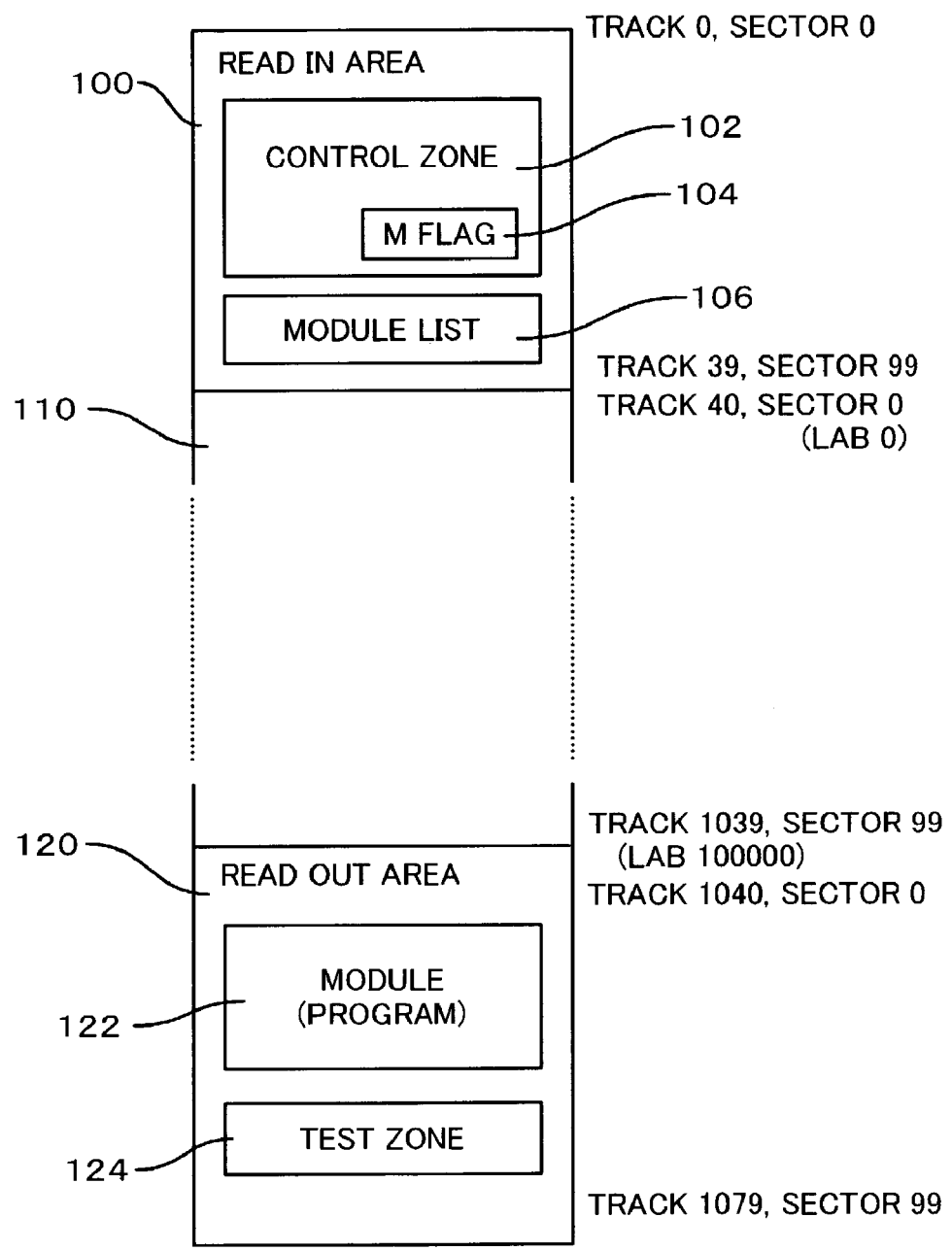
FIG. 4 is a diagram depicting the memory map of the removable storage medium in FIG. 1.

FIG. 1 is a block diagram of the external storage device according to an embodiment of the present invention, FIG. 2 is a block diagram depicting the drive mechanism in FIG. 1, FIG. 3 is a diagram depicting the memory map in FIG. 1, FIG. 4 is a diagram depicting the memory map of the storage medium, FIG. 5 is a diagram depicting the module list of the storage device in FIG. 1, and FIG. 6 is a diagram depicting the module list of the storage medium in FIG. 1.

FIG. 1 shows an MO drive 1 using an MO for the storage medium (magneto-optical disk) 72 as an example of the external storage device. The MO drive 1 comprises an MPU (microprocessor) 2, ROM (Read Only Memory) 3 which is a memory that can not be rewritten, RAM (Random Access Memory) 4 which is a memory which can be accessed at high-speed and is re-writable, interface unit 5, drive mechanism 6, and bus 7.

ROM 3 is for storing the processing programs to be executed by the MPU 2 and the parameters, and stores the later mentioned program module. RAM 4 is for temporarily storing the data of the MPU 2 for processing, and in the present invention, RAM 4 stores the programs of the medium 72. As shown in FIG. 3, the memory space in MPU 2 is comprised of ROM 3 from address 0000Hex to 3FFFHex, and RAM 4 from address 4000Hex to FFFFHex. The interface unit 5 exchanges commands and data with the host (e.g. personal computer).

The MO 72 is removable from the drive mechanism 6, and has information tracks where data is read or written using light (heat) and magnetism. The memory map of the MO 72 is comprised of the read in area 100, read out area 120, and data area 110, as shown in FIG. 4. The read in area 100 and read out area 120 are areas which cannot be accessed from the host (user), of which one area locates at the innermost circumference and the other area at the outermost circumference, and has a control zone 102 and test zone 124. In the unused area of the areas 100 and 120, the module list 106, module flag 104 and program module 122 are stored. The module flag 104 is a flag which indicates the presence of a module. The data area 110 is a user area which can be accessed by the host (user), and in this example, 10000 tracks, from track 40 and sector 0 (LBA0) to track 1039 and sector 99 (LBA100000), are assigned. 40 tracks are assigned to the read in area 100 and read out area 120 respectively.

As shown in FIG. 2, the drive mechanism 6 is comprised of an insertion slot 69 for inserting/removing the cartridge 70 for housing an optical disk medium 72 where information tracks for recording information. are created, and a spindle motor 67 for mounting the inserted optical disk medium 72 and rotating and driving the optical disk 72.

The optical disk drive mechanism 6 is comprised of an optical head for recording or regenerating information to/from the optical disk 72. The optical head is further comprised of the carriage 76 and a fixed optical unit 78. The carriage 76 is further comprised of an objective lens 80 for irradiating an optical beam 104 onto the information track of the optical disk 72, a focus actuator for driving the objective lens 80 in the optical axis direction (direction for moving to or away from the optical disk, focusing direction), and a reflecting mirror 82, and is driven so as to be movable in the radius direction of the optical disk 72. The fixed optical section 78 is comprised of optical components, including a laser diode to be a light source and a photo-detector.

In FIG. 1, the modules 30-39 are stored in the ROM 3. The module list 30 is a list of modules stored in ROM 3, and as FIG. 5 shows, the numbers of the modules stored in the ROM 3, start address on the memory, and module length, are stored. FIG. 5 shows an example when 21 modules from numbers 0 to 20 are mounted.

The initialization module 31 in FIG. 1 is for initializing the device, and will be described in detail in FIG. 7. The interrupt module 32 is for analyzing the interrupt request and starting up the module matching with the request, and will be described in detail in FIG. 7. The CDB analysis module 33 is for analyzing the provided command, in this example the CDB (Command Description Block) SCSI command is analyzed.

Figure 10:
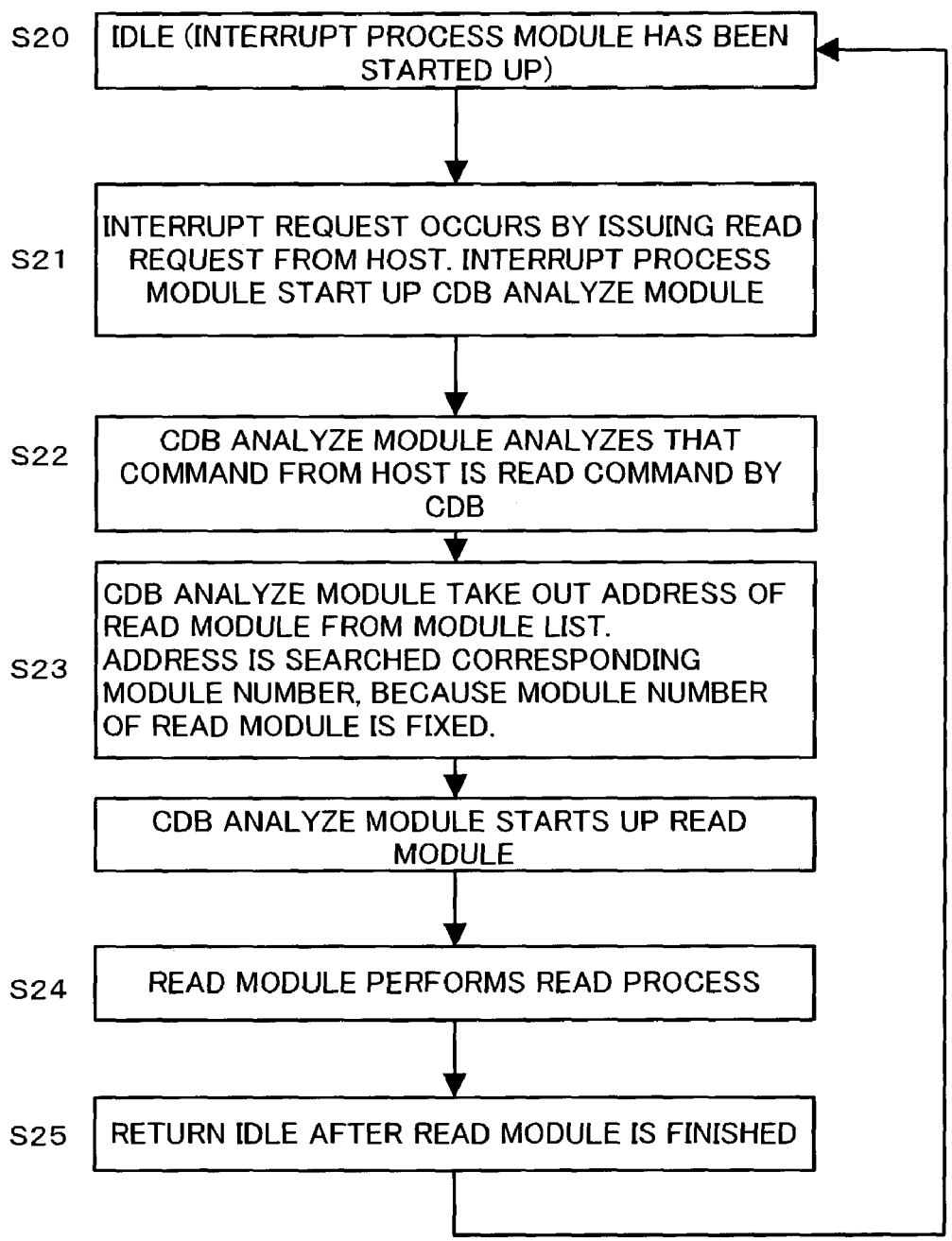
FIG. 10 is a flow chart depicting the processing of the CDB analysis module and READ module in FIG. 1.

The read module 34 is for performing read processing, and will be described in detail in FIG. 10. The cache module 35 is a module for performing cache processing during read/write, and will be described in detail in FIG. 12. The write module 36 is a module for performing write processing, and will be described in detail in FIG. 15.

The insertion processing module 37 is for performing initialization processing when the storage medium 72 is inserted into the drive, and will be described in detail in FIG. 8. The load processing module 38 is for performing load processing so that the MPU 2 can access the program module 122 of the medium 72, and will be described in detail in FIG. 8. The eject processing module 39 is for performing eject processing of the storage medium 72, and will be described in detail in FIG. 16. The buffer management area 40 and work area 41 are assigned to the RAM 4.

Now the storage module of the MO 72 will be described. As FIG. 6 shows, the module list 106 of the MO 72 has a structure which is the same as the module list 30 of the ROM 3, and is comprised of a module number, start address on the medium, and module length. This example shows that modules with module numbers 2 and 25 are stored, and also shows that these modules (programs) are stored in the program area 122 in FIG. 4. The module with the module number 2 of the MO 72 is for replacing the module with module number 2 of ROM 3, and is a cache program, for example. The module with the module number 25 of the MO 72 is a module which does not exist in the ROM 3, and is a security module, for example.

Since a program which operates on the storage device for the removable storage medium is recorded on the removable storage medium and is read and executed whenever necessary, the program matching with (optimized for) the features of the respective removable medium can be executed.

In the internal memory of the storage device, such as ROM, the modules (programs) with minimal basic functions required for driving the storage device are stored, and the modules (programs) to be used for improving the functions of the drive according to the format of using the storage medium are stored in the storage medium itself (since the removable storage medium is replaced), therefore it is unnecessary to store the modules (programs) supporting the formats of use of the entire media in the memory of the storage device, which can decrease the memory capacity at the storage device side.

Also by storing additional programs for improving the functions of the storage device in the medium, the functions of the storage device can be improved, as if it were a new product.

Also by storing a program matching with the use of the user of the storage device in the medium, the storage device can be driven according to the format of use of the user, and handling when using the device can be improved.

The program which operates on the storage device is distributed and recorded in the internal memory of the storage device and in the removable storage medium to be inserted into the storage device, and is read and executed whenever necessary, so the capacity of the internal memory required by the storage device can be decreased.

Also the programs which are not simultaneously executed are stored in the storage medium and are read and executed whenever necessary, so the capacity of the internal memory required by the external storage device can be decreased.

In the above mentioned example, the external storage device 1 of the removable medium was described using a magneto-optical disk device, but the present invention can be applied to a storage device using other disk types as well, such as a tape type and card type replaceable medium, including such optical disk devices as CD-R, CD-RW, and DVD, a magnetic disk device, and semiconductor storage device using a semiconductor storage card, for example. Also the above mentioned storage device includes not only one physically existing outside the host (CPU), such as the above mentioned storage device, but also a storage device built into the system, such as a personal computer.

Medium Processing

Figure 7:
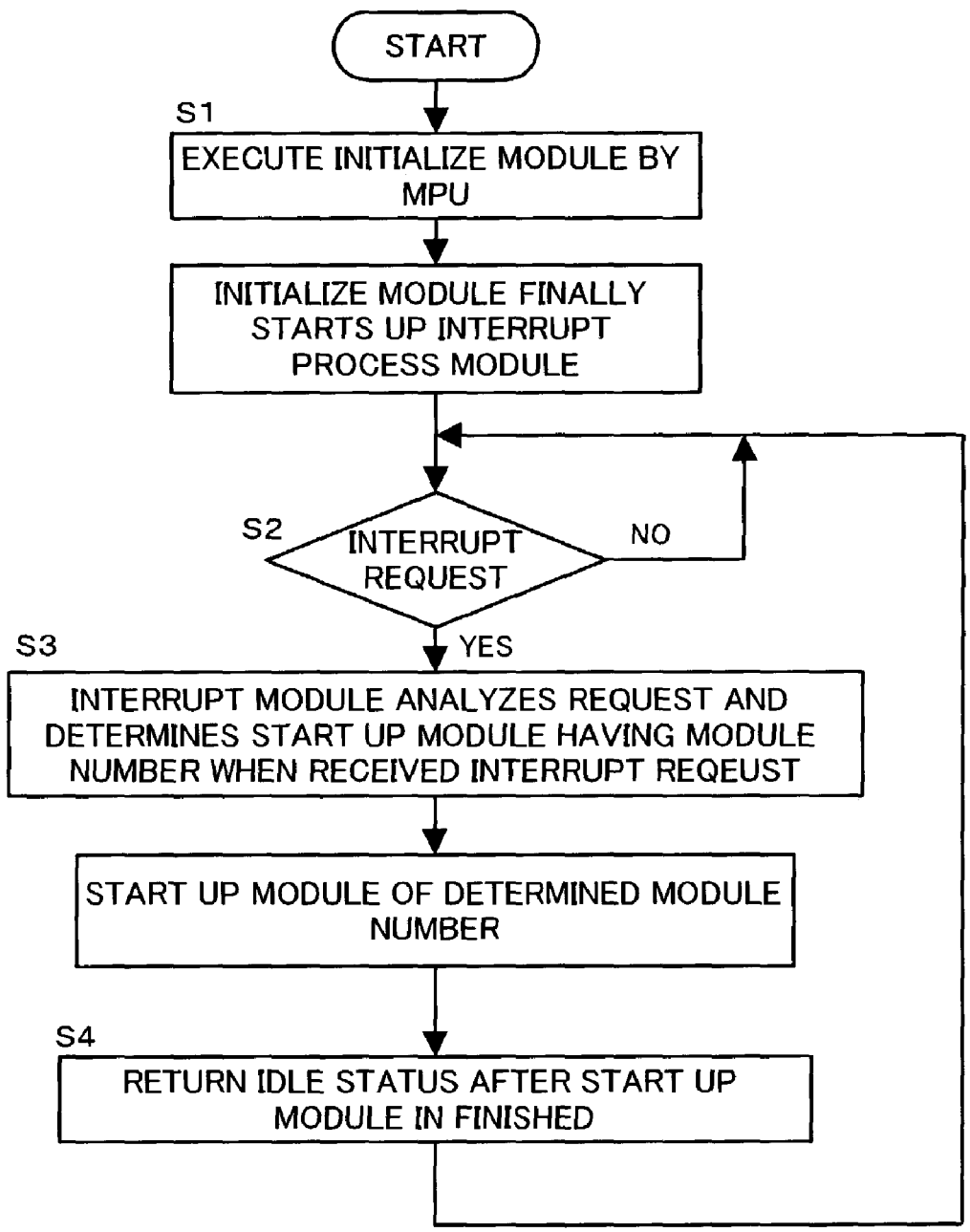
FIG. 7 is a flow chart depicting the processing of initialization and the interrupt module in FIG. 1.
Figure 8:
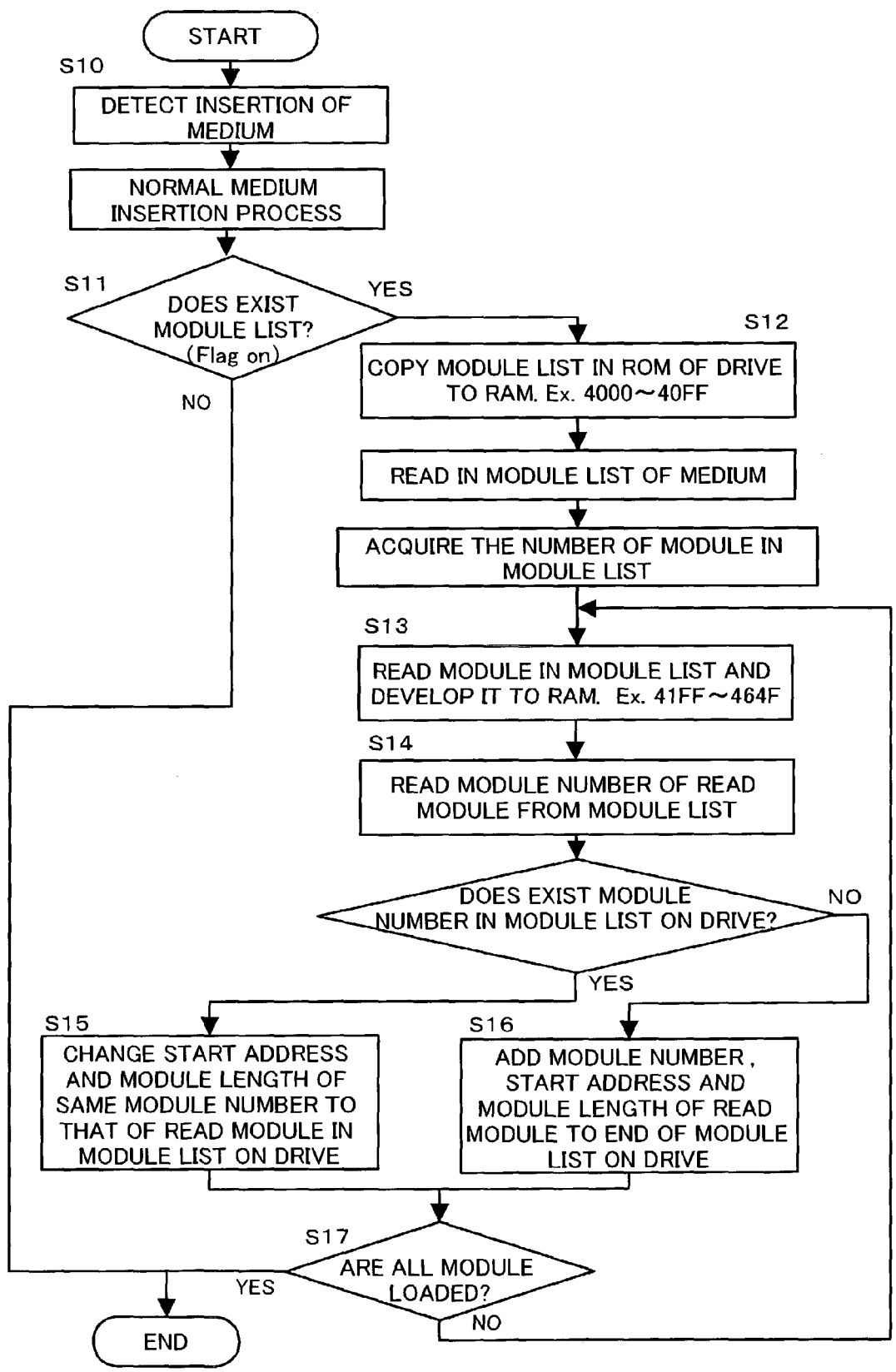
FIG. 8 is a flow chart depicting the processing of the medium insertion and load processing module in FIG. 1.
Figure 9:
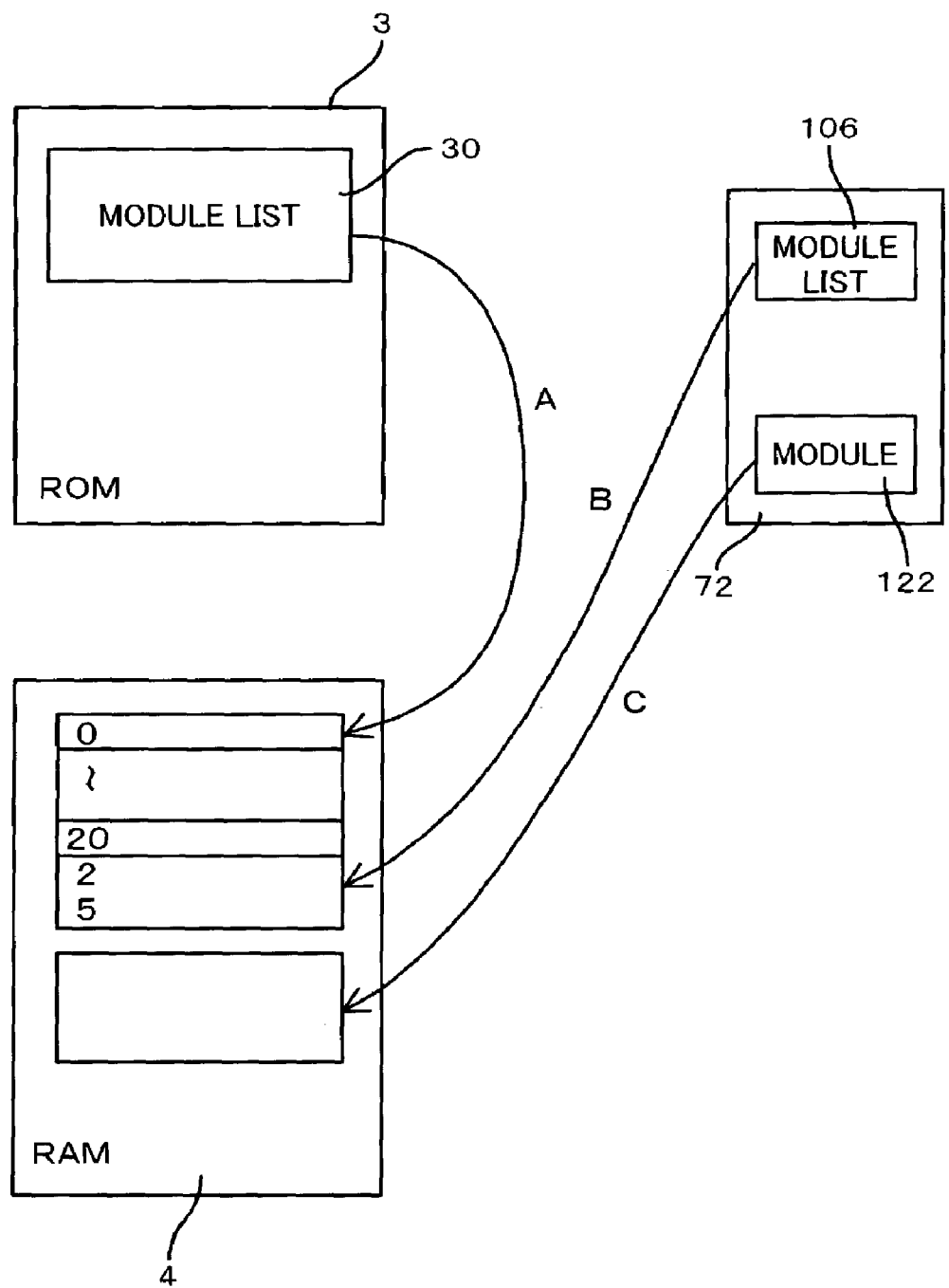
FIG. 9 is a diagram depicting the load processing in FIG. 8.

FIG. 7 is a flow chart depicting the processing flow of the initialization module and interrupt module in FIG. 1, FIG. 8 is a flow chart depicting the processing flow of the medium insertion processing module and load module in FIG. 1, and FIG. 9 is a diagram depicting the load processing.

Initialization processing when power is turned ON will be described with reference to FIG. 7.

(S1) When power ON is detected, the MPU 2 executes the initialization module 31. By executing the initialization module, a desired register and memory are initialized. The initialization module starts up the interrupt processing module 32 at the end of initialization.

(S2) The interrupt processing module 32 judges whether the interrupt request has been generated.

(S3) When the interrupt processing module 32 receives an interrupt request, the interrupt processing module 32 analyzes the request and decides the module corresponding to the request. The interrupt processing module 32 then starts up the module with the decided module number, and moves processing to the module which started up.

(S4) When the start up module ends processing and the interrupt processing module 32 receives a processing end notice, the interrupt processing module 32 returns to standby status and returns to step S2.

Now the processing operation of the medium insertion processing module 37 and load processing module 38 will be described with reference to FIG. 8.

(S10) When insertion of the storage medium 72 is detected, the medium insertion processing module 37 is started, and performs medium insertion processing, such as starting up the drive mechanism 6, reading the control zone 102 of the medium 72, analysis of read data, including the type of medium 72 (e.g. storage capacity), and setting the drive mechanism 6.

(S11) The medium insertion processing module 37 judges whether the module list exists from the module flag, in the data analysis of the control zone. If a module list does not exist, processing ends.

(S12) If the module list exists, the load processing module 38 is started up. The load processing module 38 copies the module list 30 of the ROM 3 to the work area 41 (e.g. addresses "4000"-"40FF") of the RAM 4 (A in FIG. 9). Then the load processing module 38 reads the module list 106 of the medium 72 to the work area 41 of the RAM 4 (B in FIG. 9). Then the load processing module 38 acquires the number of modules from the module list 106 of the read medium.

(S13) The load processing module 38 reads the module 122 in the module list 106 of the read medium from the medium 72, and develops it to the work area 41 (e.g. addresses "41FF"-"464F") of the RAM 4 (C in FIG. 9).

(S14) The load processing module 38 reads the module number of the read module from the module list 106, and judges whether this module number is in the module list 30 of the drive (ROM 3).

(S15) If this module number is in the module list 30 of the drive (ROM 3), the start position of the same module number in the module list 30 of the drive (ROM 3) and the module length are changed to the start position of the module 122 read from the medium 72 and the module length. FIG. 5 and FIG. 6 show an example when the module number is "2".

(S16) If this module number does not exist in the module list 30 of the drive (ROM 3), the module number of the module 122 read from the medium 72, start position, and module length are added to the end of the module list 30 of the drive (ROM 3) developed in the RAM 4. FIG. 5 and FIG. 6 show an example when the module number is "25".

(S17) The load processing module 38 judges whether all the modules of the medium are loaded. If all the modules are not loaded, processing returns to step S13, and if all the modules are loaded, the load processing ends.

In this way, the module 122 of the medium 72 is loaded so as to be used as firmware of the drive.

Now the read processing module 34 and cache module 35 will be described with reference to FIG. 10 to FIG. 15. First, the read processing module 34 will be described with reference to FIG. 10.

(S20) The interrupt processing module 32 is started up, as shown in FIG. 7, and is in standby status.

(S21) An interrupt request is generated when an instruction is sent from the host computer. The interrupt processing module 32 starts up the CDB (instruction) interpreter program 33.

(S22) The CDB (instruction) interpreter program 33 analyzes the instruction, and judges that the transmitted instruction is a READ instruction.

(S23) Since the transmitted instruction is judged as a READ instruction, the CDB interpreter program 33 fetches the address of the READ module 34 from the module list (developed in the RAM 4), and the CDB interpreter program 33 starts up the READ module 34.

(S24) The READ module 34 executes READ processing. If a cache module exists at this time, the READ module 34 starts up the cache module and executes READ processing, as described later with reference to FIGS. 11 through 14.

(S25) The started READ module 34 ends the processing, and when the interrupt processing module 32 receives an end of processing notice, the interrupt processing module 32 returns to standby status, and processing returns to step S20.

Now the processing operation of the cache module will be described. In this example, the advance-read cache module (FIG. 11, FIG. 12) and the FAT cache module (FIG. 13 to FIG. 15) will be described as a cache module.

Figure 11:
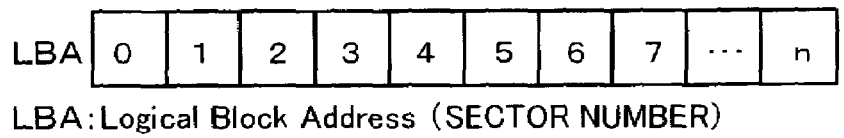
FIG. 11 is a diagram depicting the advance-reading of sectors for describing the cache module in FIG. 1.

The advance (pre)-read cache will be described with reference to FIG. 11. As FIG. 11 shows, it is assumed that sectors 0-n exist on the disk 72, and if a read instruction for sector 0 is received, the pre-read cache reads sector 0 to sector 7, for example, and stores the data in the cache memory. And the pre-read cache transfers the data of sector 0 to the host which issued the instruction. Then if the read instruction for sector 1 is received, the drive returns the data of sector 1 which is stored in the cache memory, without accessing the actual disk. By pre-reading in this way, access time is decreased.

The processing of the pre-read cache module will now be described with reference to FIG. 12.

(S30) The pre-read cache judges whether the data of the sector number LBA of the read instruction is in the cache memory (buffer) of the work area 41 of the RAM 4 using the buffer management information 40. The buffer management information 40 is for managing the cache memory (buffer), and stores the sector number of the data stored in the buffer, and the stored address.

(S31) If the data of the specified sector number is not in the buffer, the pre-read cache reads the sector of the specified sector number and the sector continuing thereto from the medium 72, and stores the read data in the buffer. If the specified sector number is LBA0, for example, the pre-read cache pre-reads the data of the sector numbers LBA0-LABN7.

(S32) According to the pre-read sectors, the pre-read cache updates the buffer management information 40 and stores it.

(S33) If the data of the specified sector number is in the buffer or if the pre-read ends, the pre-read cache transfers the data of the sector number in the buffer to the host.

Figure 13:
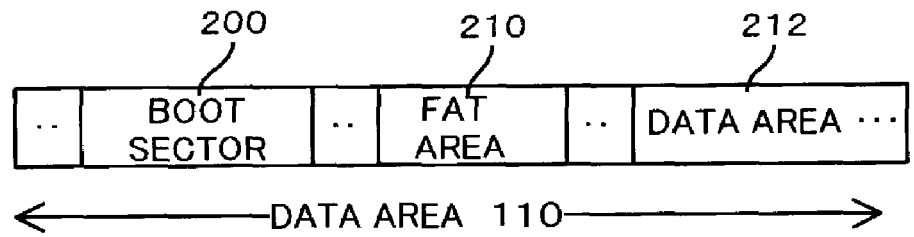
FIG. 13 is a diagram depicting the FAT format.
Figure 14:
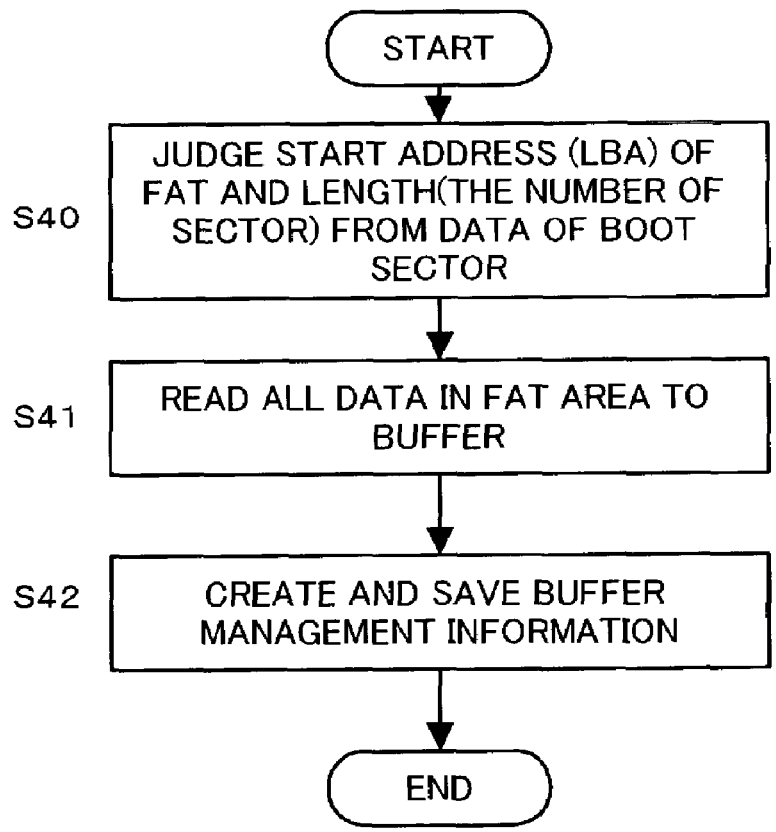
FIG. 14 is a flow chart depicting the processing of the FAT cache module.

Now the FAT (File Allocation Table) cache module will be described with reference to FIG. 13 and FIG. 14. As FIG. 13 shows, the data area 110 of the disk which is formatted by FAT is comprised of a BOOT sector 200, FAT area 210 and DATA area 212. The file is written in the DATA area 212, and the FAT area 210 stores the write position (sector position) of the file in the DATA area 212. In the disk formatted by FAT, the FAT area 210 is read/written each time a file is read/written. The FAT cache module stores the information of the FAT area 210 in the cache memory so that the frequency of reading/writing of the FAT area 210 on the medium 42 is decreased, and the read/write time is decreased. The FAT format is used for DOS and Windows OS.

Now the processing of the FAT cache module will be described with reference to FIG. 14.

(S40) The FAT cache module reads the BOOT sector 200 of the medium 72 and judges the start position (LBA) and the length (sector length) of the FAT area 210.

(S41) From the start position and length, the FAT cache module reads all the data of the FAT area 210 of the medium 72 in the buffer of the work area 41 of the RAM 4.

(S42) The FAT cache module creates the buffer management information (e.g. read address) from the read data, and stores it.

The OS accesses the FAT of the RAM 4 and reads/writes the sector number of the file.

In this example, it is assumed that the pre-read cache module has been stored in the ROM 3 in advance as the cache module 35. And the FAT cache module 122 is stored in the FAT-formatted medium 72. If the FAT-formatted medium 72 is inserted, the FAT cache module 122 is read in the RAM 4, and FAT is pre-read. If a medium 72 which is not FAT-formatted and does not store the FAT cache module is inserted, on the other hand, the cache operation is performed by the pre-read cache module 35 of the ROM 3.

For the FAT cache module, a FAT cache module, where not all of FAT but a part of FAT is cached, can be used, and a FAT cache module where a function to pre-read the sector data is added can also be used. Also the present invention can also be applied to a module which pre-reads the management information in the file management format used for a UNIX system, including LINUX.

Figure 12:
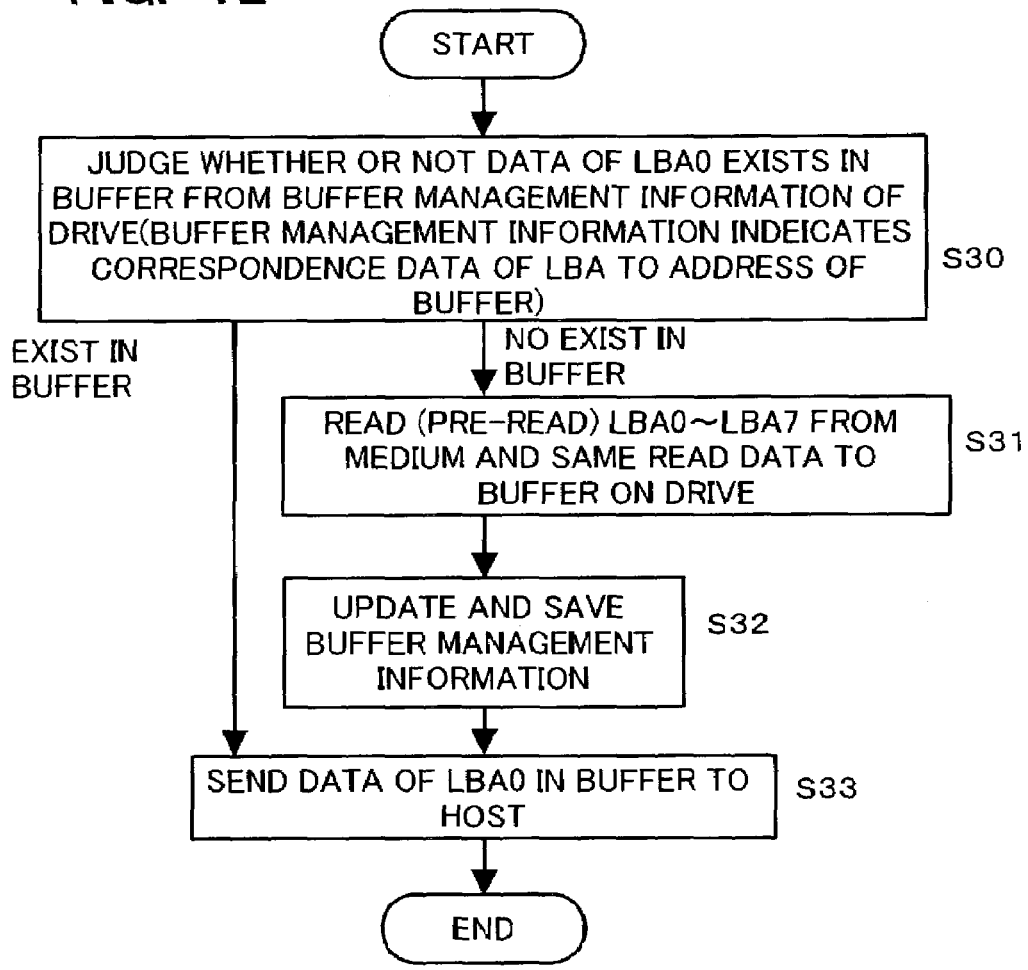
FIG. 12 is a flow chart depicting the processing of the advance-read cache module in FIG. 11.
Figure 15:
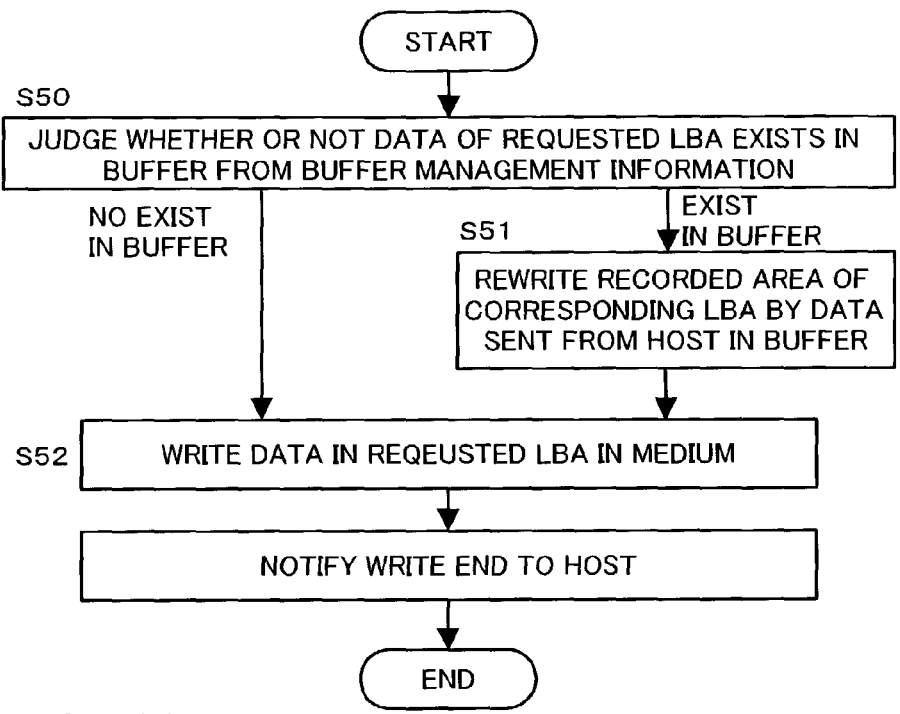
FIG. 15 is a flow chart depicting the write processing of the advance-read cache module.

Now the write processing when pre-read processing in FIG. 12 is performed will be described with reference to FIG. 15.

(S50) The FAT cache module judges whether the data of the sector number LBA of the write instruction is in the cache memory (buffer) of the work area 41 of the RAM 4 from the buffer management information 40. The buffer management information 40 is for managing the cache memory (buffer), and the sector number of the data stored in the buffer and the stored address are stored.

(S51) If the data of the specified sector number is in the buffer, the FAT cache module overwrites the area of the corresponding LBA in the buffer with the transfer data from the host.

(S52) If the data of the specified sector number is not in the buffer or after overwrite ends, the FAT cache module writes data to the sector of the requested sector number of the medium 72, and end of writing is notified to the host.

Figure 16:
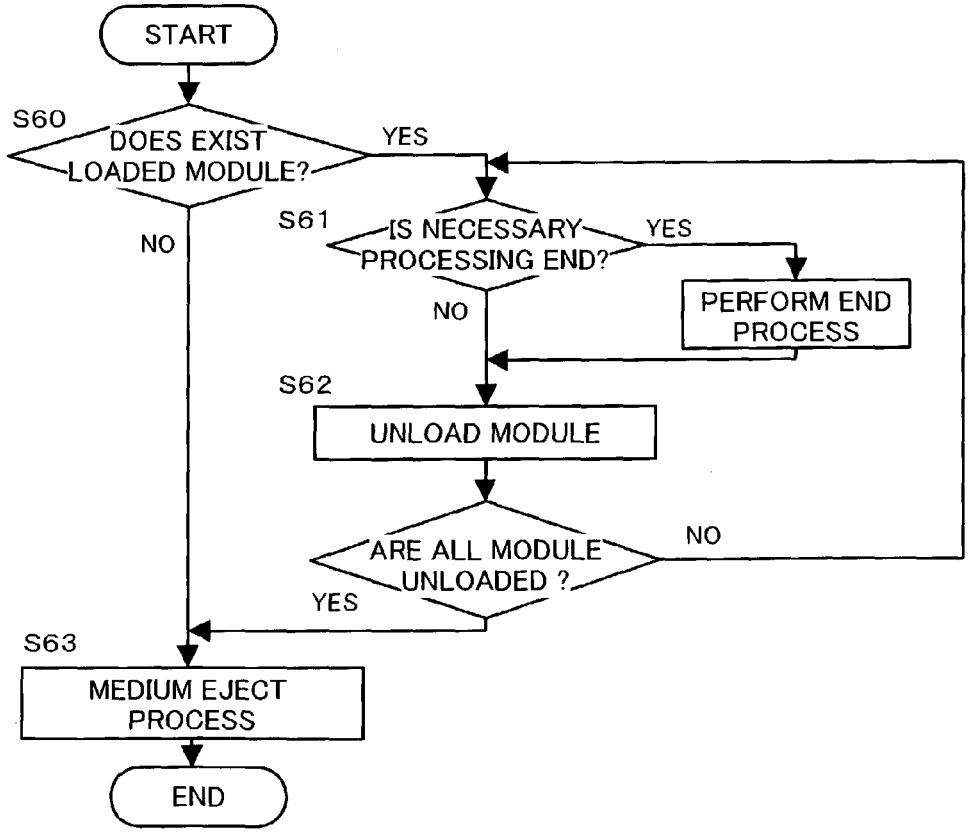
FIG. 16 is a flow chart depicting the processing of the medium eject processing module in FIG. 1.

Now the medium eject processing module 39 will be described with reference to FIG. 16.

(S60) According to the medium eject instruction, the eject processing module 39 judges whether the loaded module exists.

(S61) If the loaded module exists, the eject processing module 39 judges whether end processing (e.g. resource release) is necessary, and executes end processing if necessary.

(S62) Then the eject processing module 39 unloads the loaded module. For example, the module list of the RAM 4 is rendered invalid. And all the modules are unloaded.

(S63) The eject processing module 39 executes medium eject. In other words, the eject processing module 39 has the drive mechanism 6 execute medium eject. And processing ends.

By this, the module of the medium registered in the drive is rendered invalid (cleared) as the medium is ejected, and when another medium is inserted next, the module of the new medium is registered in the drive, so interference with the module of the previous medium can be prevented.

Other Embodiments

Figure 17:
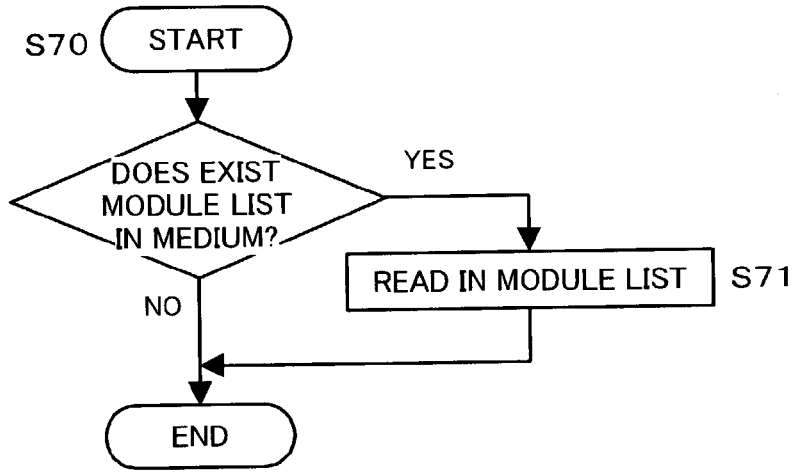
FIG. 17 is a flow chart depicting the module list read processing according to another embodiment of the present invention.
Figure 18:
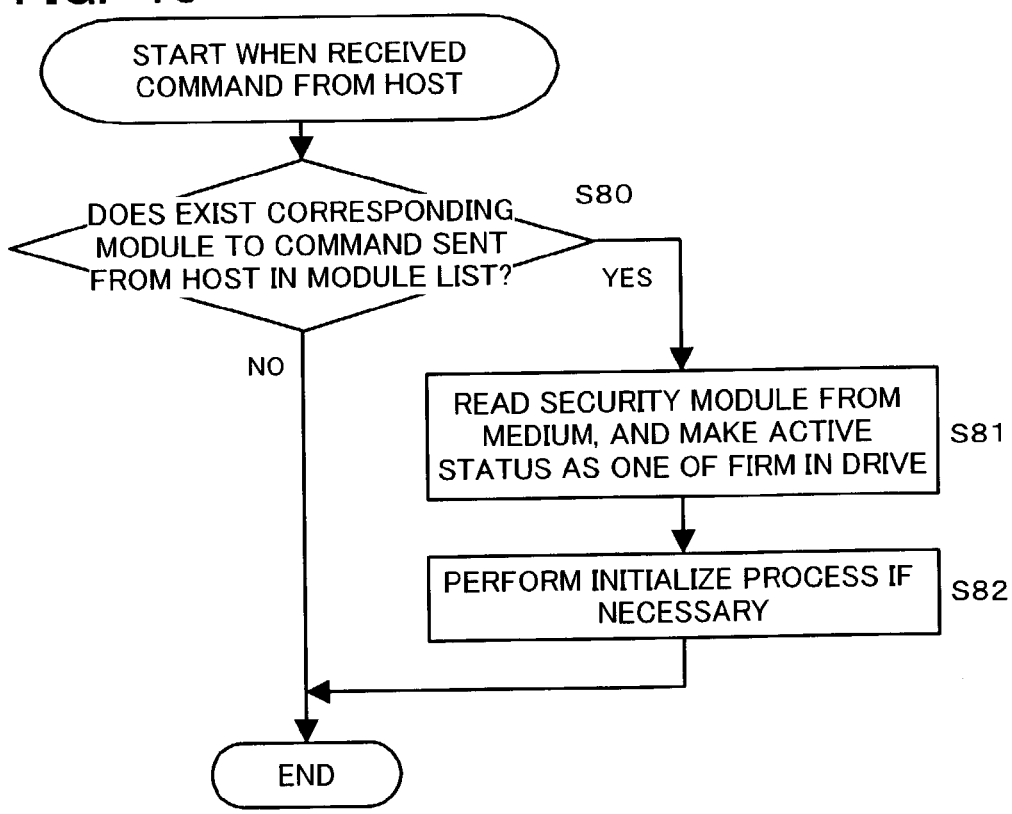
FIG. 18 is a flow chart depicting the module load processing according to another embodiment of the present invention.

FIG. 17 and FIG. 18 are flow charts depicting the module load processing of the medium according to another embodiment of the present invention. In this example, the module list is read when the medium is inserted, and the necessary module is read by the command of the host. The medium insertion processing will be described with reference to FIG. 17.

(S70) The medium insertion processing module 37 judges whether the module list exists in the data analysis of the control zone using the module flag. If the module list does not exist, processing ends.

(S71) If the module list exists, the medium insertion processing module 37 starts up the load processing module 38. The load processing module 38 copies the module list 30 of the ROM 3 to the work area 41 of the RAM 4 (A in FIG. 9). Then the load processing module 38 reads the module list 106 of the medium 72 to the work area 41 of the RAM 4 (B in FIG. 9).

Now load processing when a command is received from the host will be described with reference to FIG. 18.

(S80) When a command is received from the hosts the load processing module 38 judges whether the module corresponding to the command received from the host exists in the module list read in the step S71. If the module corresponding to the command does not exist, processing ends.

(S81) If the module corresponding to the command exists in the module list, the load processing module 38 reads the module (security module in this case) 122 specified by the command in the read module list 106 of the read medium from the medium 72, and develops it in the work area 41 of the RAM 4. And just like the above mentioned processing in FIG. 8, the load processing module 38 reads the module number of the read module from the module list 106, and judges whether this module number exists in the module list 30 of the drive (ROM 3). If this module number exists in the module list 30 of the drive (ROM 3), the load processing module 38 changes the start position of the module with this module number and the module length thereof in the module list 30 of the drive (ROM 3) to the start position of the module 122 read from the medium 72 and the module length thereof.

If this module number does not exist in the module list 30 of the drive (ROM 3), on the other hand, the load processing module 38 adds the module number and start position of the module 122 read from the medium 72 and the module length thereof to the end of the module list 30 of the drive (ROM 3) developed in the RAM 4. If initialization is necessary, the load processing module 38 performs initialization processing and ends load processing.

In this way, the module 122 of the medium 72 is loaded so as to be used as firmware of the drive.

Now the security module will be described. The purpose of security is to maintain confidentiality of the data recorded in the medium, where the medium stores the security information and the drive recognizes this security information so as to limit data access from unspecified users.

Adding security functions includes the case of adding security functions to a drive which does not have security functions, and the case of adding other security functions which do not exist on a drive to a drive which has no security functions.

Security functions are, for example (1) a function to identify the medium using the medium ID recorded in the medium, (2) a function to record the device ID to the medium and limit access to the medium in a drive other than a drive which has the device ID matching the above, (3) a function to assign a password to the medium and limit access in a case other than the case when the password, which is input, matches the above password, and (4) a function to limit access to a specified LBA range, and one of these or a combination of two or more of these can be used.

The modules of the medium were described using the examples of the cache module and the security module, but a module which can be used for another drive can also be used. ROM and RAM were described above but the present invention can be applied to another non-volatile memory and volatile memory. The embodiment shows the case when the already registered module is read, where the module is registered to the storage medium by a medium manufacturer or drive manufacturer at the factory, but it is also possible to write the flag to the medium or the module (program) using the program which is downloaded from a CD, FD or from the Internet, by the user issuing a special command, using a driver for the storage device, for example. In other words, it is possible to operate the drive as if it is a new product by storing a module to improve the functions of the drive in the medium. Also the drive can be driven according to the format of the use of the user by storing the module according to the purpose of the use of the user.

The present invention has been described by embodiments, but various modifications are possible for the present invention within the scope of the essential technical character of the present invention, and these shall not be excluded from the technical scope of the present invention.

INDUSTRIAL APPLICABILITY

The program which operates on the storage medium for a removable storage medium is recorded on the removable storage medium, and is read and executed whenever necessary, so a program matching with (optimized for) the respective removable medium can be executed.

In the internal memory of the storage device, such as ROM, modules (programs) with minimal basic functions required for driving the storage device are stored, and modules (programs) to be used for improving the functions of the drive according to the format of using the storage medium are stored in the storage medium itself (since the replaceable storage medium is replaced), so the modules (programs) corresponding to the format of use of the entire medium need not be stored in the memory of the storage device, and the memory capacity at the storage device side can be decreased.

Also by storing additional programs for improving the functions of the storage device in the medium, the functions of the storage device can be improved as if it is a new product.

Also by storing a program matching with the convenience of use of the user in the storage device, the storage device can be driven according to the format of use of the user, which improves the convenience of use.

The programs which operate on the storage device are distributed and stored in the internal memory of the storage device and the removable storage medium which is inserted into the storage device, and are read and executed whenever necessary, so the capacity of the internal memory required by the storage device can be decreased.

Programs which are not simultaneously executed are stored at the storage medium side, and can be read and executed whenever necessary, so the capacity of the internal memory required by the external storage device can be decreased.

The invention claimed is:

1. A storage device for at least reading data of a removable storage medium, comprising:
    a drive unit for reading said storage medium;
    a memory for access for storing a program module and a module list storing management information of said program module stored on said memory for access; and
    a processor for performing access processing data of said storage medium by referring to said module list and executing said program module,
    wherein said processor reads a program module stored in said storage medium, develops said program module in said memory for access from said program module stored in said storage medium, and registers a read module in said module list,
    wherein said program module stored in said storage medium provides a special function to the storage device, and
    wherein said processor, in response to an insertion of said storage medium into said storage device, judges whether or not a program module necessary to operate said storage device exists in said inserted storage medium from management information stored in said storage medium, reads a module list in said storage medium indicating said program module necessary to operate said storage device is stored in said storage medium if it is judged that said program module necessary to operate said storage device exists in said storage medium, reads said program module of said storage medium according to said module list of said storage medium, develops said program module in said memory for access, registers management information of said read module in said module list, and executes said program module corresponding to a process request by referring to said module list registering said management information of said read module.

2. The storage device according to claim 1, wherein said processor renders a registered program module invalid when said storage medium is ejected.

3. The storage device according to claim 1, wherein said processor detects a presence of said program module necessary to operate the device by a module flag of the management information stored in said storage medium when said storage medium is inserted.

4. The storage device according to claim 1, wherein said processor develops the module list of the memory for a program in the memory for access to create a developed module list, refers to the module list where said read module is registered in said developed module list, and executes said read program module.

5. The storage device according to claim 1, wherein said program module comprises a cache program module.

6. The storage device according to claim 1, wherein said program module comprises a security program module.

7. The storage device according to claim 1, wherein said processor reads said module list from a ROM to RAM and adds the read program module to said module list in the RAM.

8. A control method for a storage device for at least reading data of a removable storage medium, comprising the steps of:
    reading a program module stored in said storage medium which is inserted into a drive unit, developing said program module in a memory for access, and registering a read module in a module list; and performing access processing of the data of said storage medium by referring to said module list and executing said program module stored in the memory for access, wherein said program module stored in said storage medium provides a special function to the storage device, and wherein the reading comprises:

judging whether or not a program module necessary to operate the device is present in said inserted storage medium from management information stored in said storage medium in response to an insertion of said storage medium into said storage device;

reading a module list in said storage medium indicating said program module necessary to operate the device is stored in said storage medium if it is judged that said program module necessary to operate the device is present in said storage medium;

reading said program module of said storage medium according to said module list of said storage medium;

developing said program module of said storage medium in said memory for access; and registering management information of said read module in said module list.

9. The control method for the storage device according to claim 8, further comprising a step of rendering a registered program module invalid when said storage medium is ejected.

10. The control method for the storage device according to claim 8, wherein said registration step comprises a step of detecting a presence of said program module necessary to operate the device by a module flag of the management information stored in said storage medium when said storage medium is inserted.

11. The control method for the storage device according to claim 8, wherein said registration step comprises a step of developing the module list in said memory for access to create a developed module list, and registering said read module in said developed module list; and said processing step comprises a step of referring to the module list registered in said registration step and executing said program module.

12. The control method for the storage device according to claim 8, wherein said program module comprises a cache program module.

13. The control method for the storage device according to claim 8, wherein said program module comprises a security program module.

14. The control method for the storage device according to claim 8, further comprising:

a step of reading a module list from a ROM to RAM; and a step of adding the read program module to said module list in the RAM.

15. A storage device for at least reading data of a removable storage medium, comprising:

a drive unit for reading said storage medium;

a memory for access for storing a program module and a module list required for processing of said storage device; and a processor for performing access processing of the data of said storage medium by referring to said module list and executing said program module, wherein said processor reads the program module stored in said storage medium, develops the program module in said memory for access, and registers a read module in said module list, wherein said program module stored in said storage medium comprises a program module for providing a special function to the storage device itself, and wherein said processor changes an attribute in said module list of said memory to an attribute of the read program module when a number of the program module having a same number as a number of the read program module exists in said module list of said memory.

16. A control method for a storage device for at least reading data of a removable storage medium, comprising the steps of:

reading a program module stored in said storage medium which is inserted into a drive unit, developing the program module in a memory for access, and registering a read module in a module list; and performing access processing of the data of said storage medium by referring to said module list and executing said program module stored in the memory for access, wherein said program module stored in said storage medium comprises a program module for providing a special function to the storage device itself, and further comprising a step of changing an attribute in said module list of said memory to an attribute of the read program module when a number of the program module and a number of the read program module exists as a same number in said module list of said memory.

17. A storage device for at least reading data of a removable storage medium, comprising:

a drive unit for reading said storage medium;

a memory for access for storing a program module and a module list storing management information of said program module stored in said memory for access; and a processor for performing access processing of data of said storage medium by referring to said module list and executing said program module, wherein said processor, in response to an insertion of said storage medium into said storage device, judges whether or not a program module necessary to operate said storage device exists in said inserted storage medium from management information stored in said storage medium, reads a module list in said storage medium indicting said program module necessary to operate the device is stored in said storage medium if it is judged that said program module necessary to operate the device exists in said storage medium, reads said program module of said storage medium according to said module list of said storage medium, develops said program module of said storage medium in said memory for access, registers management information of said read module in said module list.

* * * * *

UNITED STATES PATENT AND TRADEMARK OFFICE
CERTIFICATE OF CORRECTION

PATENT NO.        : 7,444,470 B2
APPLICATION NO.   : 10/457633
DATED             : October 28, 2008
INVENTOR(S)       : Makita Page 1 of 1

It is certified that error appears in the above-identified patent and that said Letters Patent is hereby corrected as shown below:

Col. 12, line 11, delete "processing data" and insert --processing of data--

Signed and Sealed this

Twenty-fourth Day of February, 2009

JOHN DOLL
*Acting Director of the United States Patent and Trademark Office*